RADIO APPARATUS
Filed Aug. 10, 1959 2 Sheets-Sheet 1
FIG. 1
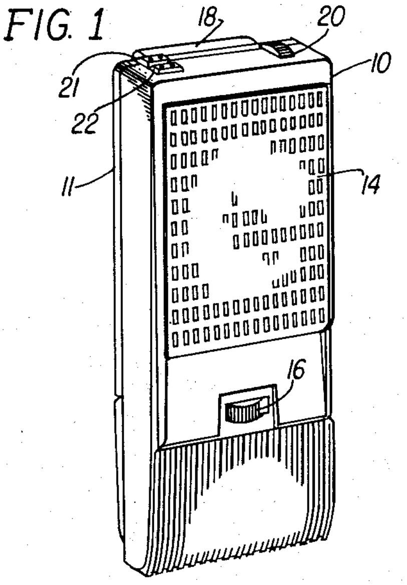
FIG. 3
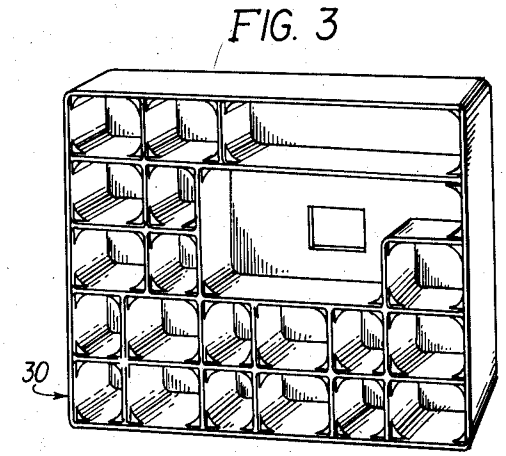
FIG. 2
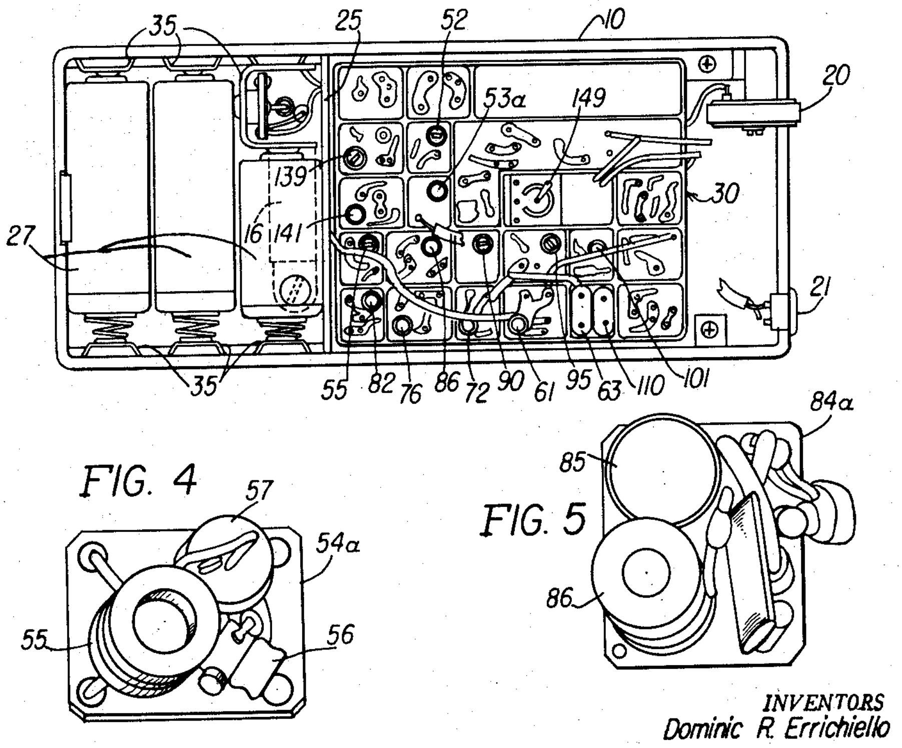
FIG. 4, FIG. 5
INVENTORS
Dominic R. Errichiello
BY Raymond G. Worobey
Mueller & Aichele
Attys.

RADIO APPARATUS

Filed Aug. 10, 1959 2 Sheets-Sheet 2

INVENTORS
Dominic R. Errichiello
BY Raymond G. Worobey
Mueller & Aichele
Attys.

United States Patent Office 2,963,577

Patented Dec. 6, 1960

2,963,577

RADIO APPARATUS

Dominic R. Errichiello, Melrose Park, and Raymond G. Worobey, Stickney, Ill., assignors to Motorola, Inc., Chicago, Ill., a corporation of Illinois Filed Aug. 10, 1959, Ser. No. 832,675

9 Claims. (Cl. 250—16)

This invention relates to radio communication apparatus and more particularly to an improved construction of high gain miniaturized communication units.

Various types of miniaturized radio equipment have been proposed in the past, but for the most part such equipment has not offered performance which is comparable with larger and more conventional equipment. For example, in building a pocket-size receiver it has been common to sacrifice sensitivity and selectivity, and even output power, in order to maintain desirable battery life and small size and weight. The increasing use of transistors has to some extent aided in the successful construction of miniaturized communication equipment but considerable difficulty has still been experienced in building such equipment in miniaturized form with many closely spaced high gain stages all properly operating within a housing of small overall volume. Furthermore, service or repair of compact equipment of this type may be difficult because of the crowding of the very small electrical components used in the apparatus.

It is an object of this invention to provide a pocket-type communication unit which is of compact form, light in weight, and entirely self-contained within a small housing.

Another object is to provide such a communication unit having a plurality of circuit stages therein which are individually protected and securely retained to withstand portable use and wherein the circuits are fully accessible for servicing and easily removed to simplify repair.

A further object is to provide a pocket-type communication receiver having a plurality of high gain circuits positioned in close proximity to one another and constructed to be successfully operable without undesirable interaction among them.

A still further object is to provide a pocket-type miniaturized communication receiver of the dual conversion superheterodyne type having reduced battery drain and a space saving antenna system for received signals.

A feature of the invention is the provision of a miniaturized communication unit having the various stages of the unit formed as separate modules on plated circuit boards, with the modules enclosed in individual compartments of a sub-housing to afford shielding and protection thereof.

A further feature is the provision of such a miniaturized communication unit having all of the electrical connections to the modular stages exposed along one side of a sub-housing for expediting testing of the circuitry and removal thereof for repair. These stages may further have the tunable elements accessible through the circuit panels for simplifying alignment of the miniaturized unit in its assembled form.

Still another feature is the provision of a highly sensitive dual conversion superheterodyne receiver having modular receiver stages arranged in extremely compact form and in a pattern to improve isolation between the high gain stages.

A further feature is the provision of a miniaturized communications receiver having an improved space saving antenna system completely self-contained within the receiver and comprising the battery, connection means for the battery, and the receiver sub-housing shield structure.

In the drawing:

Fig. 1 is a perspective view of the completed communication unit;

Fig. 2 is a plan view of the communication unit in actual size with the housing cover removed;

Fig. 3 is a perspective view of the sub-housing of the unit;

Figs. 4 and 5 are greatly enlarged perspective views of particular modular stages of the unit.

Figure 6:
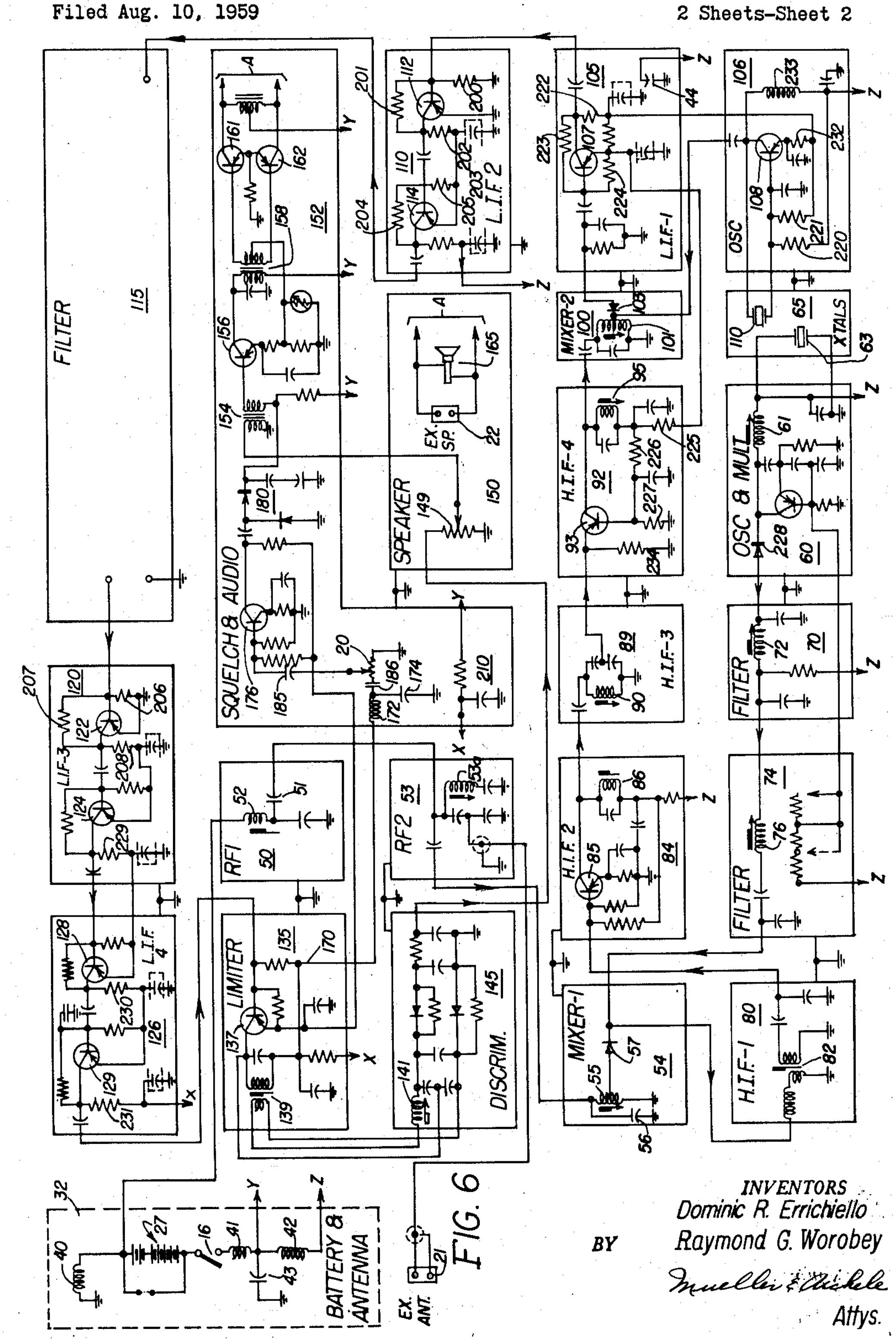
Fig. 6 is a schematic diagram of the circuit of the unit arranged so that the positioning of the different stages corresponds with the actual positioning of these stages in the communication unit.

The communication unit of the invention constructed as a receiver is shown in Fig. 1. This unit includes a housing 10 with a removable cover or side 11, both formed of plastic for weight reduction and to prevent shielding of the internal antenna. The housing 10 includes a grill 14 behind which a loudspeaker is disposed. There is also an on-off switch 16 for deenergizing the unit when it is not in use. The cover 11 carries a clip 18 (not completely shown) for fastening the unit to the apparel of the user. Available at the top of the housing 10 there is a squelch setting control 20 and electrical connectors 21 and 22 for use respectively in connecting an external antenna and an additional loudspeaker to the unit, although these are unnecessary and the unit is fully self-contained and operative without these additional accessories.

The cover 11 is hinged (the hinge is not shown) on the divider 25 to permit access to the batteries 27 for replacement and to permit access to the receiver sub-housing 30 (Fig. 2). The divider 25, composed of electrical insulating material, divides the housing into a battery and antenna compartment and into a main receiver section which contains the sub-housing 30.

In Fig. 6 the battery and antenna means is contained within the section 32. The particular receiver being described is intended to receive FM signals in the 144–174 megacycle range which are picked up by the batteries 27 and the associated terminals 35 for the batteries all acting as an antenna. In Fig. 6 it will be noted that one terminal of the battery 27 is connected to ground through RF choke 40 thus isolating the RF signals from the ground reference point. The other output terminal of the battery is series connected with switch 16 and RF chokes 41, 42. These chokes are respectively connected to terminals marked Y and Z which are coupled to designated points in the circuit of Fig. 6 for energizing the various receiver stages with respect to ground. Terminals Y and Z are by-passed by capacitors 43, 44 (module 105) to form a pi filter network. It should be noted that the sub-housing 30 is electrically conductive and that each of the rectangles in the diagram of Fig. 6 is intended to indicate a cell or compartment of the sub-housing and that this sub-housing being grounded forms a shield for the circuitry and a ground plane for the proper operation of the battery and its connectors as an antenna.

The radio frequency signals appearing at the junction of choke 40 and battery 27 are applied to the first radio frequency module 50, which includes a D.C. blocking capacitor 51, and a tuning inductor 52. From there the signals are coupled to the second radio frequency module 53, tuned by inductor 54. Both modules provide initial tuning of the signal. The jack or connector 21 is also coupled to the module 53 for the application of signals from an external antenna to this circuit. After this tuning selection the radio frequency signal is applied to the first mixer module 54 which includes a parallel tuned circuit, comprising inductor 55 and tuning capacitor 56, and a diode mixer 57.

The first local oscillator module 60 includes a variable tuning inductor 61. Also connected to this oscillator is a crystal 63 mounted in the crystal module 65. The local oscillator in module 60 is a third mode, series resonant, type the output signal from which is multiplied three times by means of the multiplier diode 228 and applied to the filter module 70 tuned by means of variable inductor 72. The signal from module 70 is applied to the injection filter module 74 and from there to the diode mixer 57. The filter in module 74 is tuned by means of variable inductor 76. The transistorized oscillator in module 60 is crystal controlled by crystal 63 so that its output signal when tripled and applied to the first mixer in module 54 will produce an intermediate frequency signal of 12 megacycles.

The 12 megacycle, or high intermediate frequency signal is applied to the module 80 having a circuit tuned to this signal frequency. This module includes a transformer 82 with a variable tuning core. The output of the module 80 is fed to the high intermediate frequency amplifier module 84 which includes an amplifier transistor 85. The signal in this stage is also tuned by means of a variable inductor 86. The output of the module 84 is applied to the circuit of module 89 which includes a tuned network having a variably tuned inductance 90. The signal from module 90 is further coupled to the IF amplifier circuit in module 92. This circuit includes an amplifier transistor 93 and a circuit which is tuned to the signal frequency by means of the variable inductor 95.

The output from the high IF amplifier circuit 92 is applied to the second mixer module 100 having a resonant circuit tuned by means of variable inductor 101. This mixer circuit includes a mixer diode 103 to which a signal from the low frequency local oscillator module 106 is also applied. This oscillator circuit includes a transistor 108 to which is coupled a crystal 110 in the crystal module 65. The output signal from the second local oscillator in module 106 is controlled in frequency to produce a second intermediate frequency at the output of the second mixer in module 100 which is at a frequency of 455 kilocycles. The oscillator in module 106 is of the fundamental, antiresonant, crystal controlled type.

The signal at a frequency of 455 kc., or the low intermediate frequency signal, is amplified in the IF amplifier circuit of module 105 which includes a transistor 107. A signal from module 105 is fed to the low IF amplifier circuit in module 110 where it is further amplified by the transistors 112 and 114. The signal from module 110 is then applied to a filter module 115 which provides great selectivity for the signals at 455 kilocycles within a sharply defined bandwidth. This filter may include various preset inductors and capacitors to provide a bandwidth, for example, of 30 kc. or 10 kc. The filter of module 115, as well as the overall receiver circuit, may be constructed in accordance with the teachings of Patent No. 2,608,649, issued August 26, 1952, to Henry Magnuski and owned by the assignee of the present invention.

The signal at the low intermediate frequency, after selection in the filter of module 115, is then applied to a low intermediate frequency amplifier 120 which includes amplifier transistors 122 and 124. The signal is then further amplified in the low intermediate frequency amplifier module 126, the circuitry of which includes the amplifier transistors 128 and 129.

After amplification in the circuit of module 126 the signal is coupled to the limiter circuit in the module 135 which includes a transistor 137. This limiter circuit further has a tuned transformer 139. The output of the limiter circuit is coupled through a tuned inductor 141 to the discriminator circuit of the module 145. The modulation of the incoming signal is derived in the circuit of module 145 and this is developed across a fixed portion of a variable volume control resistor 149 in the module 150.

A portion of the demodulated audio signal is then applied to the audio amplifier circuit in the module 152. This circuit includes an input transformer 154 which couples the signal to a first amplifying transistor 156 from which the signals are applied through a transformer 158 to the push-pull connected transistors 161 and 162. After undergoing power amplification by the transistors 161 and 162 the audio output signal is fed to the loudspeaker 165 part of which is located in module 150. The loudspeaker 165 is positioned to project the sound through the grill 14 (Fig. 1).

Squelch action, to silence the receiver output of speaker 165 in the absence of a signal, is obtained by deriving the audio noise produced at the supply voltage decoupling point 170 in the limiter circuit of module 135. This noise is developed across the fixed portion of squelch control 20. A filtering network between point 170 and the control 20, including series choke 172 and shunt capacitor 174, removes the 455 kilocycle IF signal so that essentially audio frequency noise is developed across the squelch control 20. A portion of this noise is applied to the noise amplifier transistor 176 in the module 152. This amplified noise is then applied to a voltage doubler rectifier circuit 180 which provides a D.C. bias applied through the secondary winding of the transformer 154 to the base of the audio amplifier transistor 156 for cutting off this transistor when the receiver is not quieted, that is, when a carrier is not being received.

However, when a carrier is received the nose signals developed at control 20 are greatly reduced in accordance with known principles of FM receiver operation and a sufficient voltage is not rectified in the rectifier circuit 180 to cause cut-off of transistor 156 so that the audio amplifier is rendered operative to pass the detected signals from the discriminator circuit in module 145. The various components in the network applying signals to the noise amplifier transistor 176, including capacitor 185, and capacitor 186, form a high pass audio filter (passing noise only) to attenuate the normal voice frequencies in a received signal so that these signals do not tend to develop a squelch control voltage to reclose the squelch during reception of a desired signal. A squelch circuit of the type shown herein is described and claimed in application Serial No. 616,473, filed October 17, 1956, in the name of John F. Mitchell and assigned to the assignee of the present invention.

As should be apparent in Fig. 2, this all transistorized, dual conversion, communication receiver is constructed in extremely compact form. Attention is drawn to the arrangement of modules shown in Fig. 6 wherein the signal path from stage to stage is essentially around the outer portion of the stage arrangement so that the signal connections between stages are short and so that there is a maximum of isolation among the stages until the signal has been detected. The audio section then is positioned centrally of the RF and IF signal loop since the problem of undesirable feedback and interaction is less in this section of the receiver.

In order to reduce the current drain on the batteries, several of the receiver stages are connected as portions of a voltage divider network which is coupled directly across the batteries. These stages therefore may be considered as series connected in relation to the direct current supply and this reduces power losses which might otherwise be entailed in voltage dropping resistors. For example, it may be noted that there is a D.C. path from ground in the low intermediate amplifier in module 120 through transistor 122 and resistor 208, through transistor 124 and resistor 229. Resistor 229 is connected to transistor 128 in the low IF amplifier circuit in module 126, through resistor 230, through transistor 129 and resistor 231 to the point X which is coupled through a filter 210 in module 152 to the battery supply lead labeled Y.

The circuits of oscillator module 106, low IF amplifier module 105, and high IF amplifier module 92 are also series connected for the D.C. energizing potential. The battery supply lead labeled Z is coupled to the module 106 through the series connection of inductance 233, transistor 108, and resistor 232, and to the series coupled resistor 222 and transistor 107 in module 105. Transistor 107 is series coupled with resistors 225, inductance 95, transistor 93 and resistor 234 in module 92. Resistor 234 is connected to ground.

As shown in Fig. 3, the sub-housing 30 forms a plurality of cells or compartments which are closed on five sides with all of the open sides facing in the same direction. This sub-housing is constructed of molded polyester plastic which is chemically plated with copper and a thin layer of gold to prevent oxidation. The sub-housing thus forms an electrical shield which is grounded in the electric circuitry of the receiver. Each circuit of the module is composed of a small printed circuit board which is of a size and shape to enclose an open side of the compartment in sub-housing 30 in which that particular stage or circuit is disposed. Fig. 4 shows a plated circuit board **54*a* (greatly enlarged) which carries the inductor 55, diode 57 and other associated components for the first mixer of module 54**.

Fig. 5 shows a printed circuit board **84*a* which carries the transistor 85, the variable inductor 86, and other components of the high intermediate frequency amplifier of the module 84. Others of the modular units are similarly constructed. The circuits are assembled by fitting a plated circuit board with the components mounted thereon into its appropriate compartment with the components extending within the compartment to be shielded and protected. All of the wiring, both plated circuit wiring on the panels or boards themselves, and the relatively few connections between the modular units are on the side of a printed circuit panel facing outwardly of the sub-housing 30. With all of the wiring of the receiver thus exposed, the problem of servicing the receiver and using a test meter on various portions of the circuit is greatly simplified. Furthermore, it may be noted in Fig. 2 that all of the tuning slugs of the various inductors in the receiver stages are available through the associated printed circuit boards so that these may be adjusted and the receiver aligned when it is completely assembled. For repair of a unit it is possible to unsolder the relatively few external connections to a given module and withdraw it from its enclosing compartment in the sub-housing 30** for repair of a particular individual component or replacement of the entire circuit module.

This invention provides, therefore, a miniaturized communication unit of improved construction wherein a plurality of high gain stages are successfully operative in a compact pocket size unit. Furthermore, the apparatus may be constructed in the form of a dual conversion superheterodyne receiver of the communication type which provides performance specifications comparing favorably with those of much larger equipment. The particular circuit described is one highly suitable for miniaturization since the circuit has a very low battery drain and includes a space saving antenna structure for the apparatus.

We claim:

1. A self-contained, pocket size communication unit including in combination, an enclosing housing, battery connection and retaining means supported within said housing, an electrically conductive sub-housing supported within said housing and including a plurality of adjacent compartments open on one side, a plurality of individual circuit modules comprising stages in said communication unit and each including a printed circuit board and circuit compartments supported on one side thereof with such boards enclosing the open sides of said compartments and substantially all of the components of each stage thereby being enclosed within a compartment, and conductor means extending between said printed circuit boards external of said compartments to provide the sole electrical connections for each of said stages.

2. A self-contained, pocket size communication receiver including in combination, an elongated housing, battery connection and retaining means supported within said housing, an electrically conductive sub-housing supported within said housing and including a plurality of adjacent compartments open only on one side, a plurality of individual circuit modules comprising stages in said communication receiver and each including a printed circuit board with printed circuitry disposed on one side thereof, receiver circuit components supported on the other sides of such printed circuit boards, said boards being positioned to enclose the open sides of said compartments with substantially all of the components of each stage thereby being enclosed within a compartment, and conductor means extending between said printed circuit boards external of said compartments to provide the sole electrical connections for each of said stages.

3. A self-contained, pocket size communication receiver including in combination, an elongated housing, battery connection means supported within said housing, an electrically conductive sub-housing supported within said housing and including a plurality of adjacent compartments open only on one side, a plurality of individual circuit modules comprising stages in said communication receiver and each including a printed circuit board with printed circuitry disposed on one side thereof, receiver circuit components supported on the other sides of such printed circuit boards, said printed circuit boards having apertures therein and said circuit components including variable tuning elements with adjustable means therefor exposed through the apertures in said printed circuit boards, said boards being positioned to enclose the open sides of said compartments with substantially all of the components of each stage thereby being enclosed within a compartment, and conductor means extending between said printed circuit boards external of said compartments to provide the sole electrical connections for each of said stages.

4. A self-contained pocket size communication receiver including in combination, an enclosing housing having first and second portions separable from one another for access to the interior of said housing, battery connection and retaining means supported within said housing, an electrically conductive sub-housing supported within said housing and including a plurality of adjacent compartments open on one side, a plurality of individual circuit modules comprising stages in said receiver and each including a printed circuit board and circuit components supported on one side thereof with such boards enclosing the open sides of said compartments and substantially all of each stage thereby being enclosed within a compartment, a conductor means extending between the printed circuit boards external of said compartments to provide the sole electrical connections for each of said stages, said receiver including a radio frequency input stage coupled to said battery connection and retaining means and to said sub-housing for deriving radio energy therefrom and thereby providing internal antenna means for said receiver.

5. A self-contained, pocket size communication receiver including in combination, an elongated non-conductive housing, battery connection and retaining means supported within said housing, an electrically conductive sub-housing supported within said housing longitudinally spaced therein from said battery connection and retaining means, said sub-housing including a plurality of cellular sections, a plurality of individual circuit modules comprising transistorized superheterodyne receiver stages individually enclosed in said cellular sections, and conductor means extending between said modules external of said cellular sections to provide the sole electrical connections for each of said receiver stages, said receiver stages including a radio frequency input circuit coupled to said battery connection and retaining means and to said sub-housing for pickup of radio frequency signals for utilization in said receiver.

6. A self-contained, pocket size communication receiver including in combination, an elongated non-conductive housing, power supply means including a battery and connection means therefor supported within said housing, an electrically conductive sub-housing supported within said housing and spaced longitudinally therein from said power supply means, said sub-housing including a plurality of cellular sections, a plurality of individual circuit modules comprising transistorized superheterodyne receiver stages individually enclosed in said cellular sections, and conductor means extending between said modules external of said cellular sections to provide the sole electrical connections for each of said receiver stages, said conductor means including radio frequency filter means intercoupling said power supply means and said circuit modules for energizing said receiver stages, said receiver stages including a radio frequency input circuit coupled to said power supply means and to said sub-housing for pickup of radio frequency signals for utilization in said receiver.

7. A radio communication unit including in combination, an enclosing housing having first and second housing sections with said first section comprising a removable side of the housing for access to the interior thereof, battery connection and retaining means carried in said second housing section, an electrically conductive sub-housing supported within said second housing section, said sub-housing including a plurality of adjacent compartments each having an open side facing said first housing section, a plurality of individual circuit modules comprising stages in the communication unit, said circuit modules including a printed circuit board and circuit components supported thereon with such boards positioned to enclose the open sides of said compartments and substantially all of each stage thereby being enclosed within a compartment, and conductor means extending between the printed circuit boards external of said compartments to provide the sole electrical connections for each of said stages.

8. A self-contained, pocket size communication receiver including in combination, an elongated non-conductive housing, power supply means supported within said housing, an electrically conductive sub-housing supported within said housing longitudinally spaced from said power supply means, said sub-housing including a plurality of cellular sections, a plurality of individual circuit modules comprising transistorized receiver stages individually enclosed in said cellular sections, conductor means extending between said modules external of said cellular sections to provide the sole electrical connections for each of said receiver stages, said receiver stages including first mixer and oscillator means, high frequency intermediate frequency amplifier means, second mixer and oscillator means, low frequency intermediate frequency amplifier means, filter means for low intermediate frequency signals, detector and audio amplifier circuit means and a loudspeaker to form a dual conversion superheterodyne receiver, and radio frequency coupling means connected between said power supply means and said sub-housing and coupled to said first mixer means for pickup of radio frequency signals for utilization in said receiver.

9. A self-contained, pocket size communication receiver including in combination, an elongated non-conductive housing, power supply means including connector means therefor supported within said housing, an electrically conductive sub-housing supported within said housing longitudinally spaced from said power supply means, said sub-housing including a plurality of cellular sections, a plurality of individual circuit modules comprising transistorized superheterodyne receiver stages individually enclosed in said cellular sections, conductor means extending between said modules external of said cellular sections to provide the sole electrical connections for each of said receiver stages, a plurality of said stages each including resistor means and transistor means coupled thereto, said conductor means including means coupling said resistor means in series across said connector means to provide series energization of said transistor means for reducing power drain in said receiver, and radio frequency coupling means connected between said power supply means and said sub-housing and coupled to one of said receiver stages for pickup of radio frequency signals for utilization in said receiver.

No references cited.